US009380501B2

(12) United States Patent
Shaheen et al.

(10) Patent No.: US 9,380,501 B2
(45) Date of Patent: Jun. 28, 2016

(54) METHOD AND SYSTEM FOR SWITCHING A RADIO ACCESS TECHNOLOGY BETWEEN WIRELESS COMMUNICATION SYSTEMS WITH A MULTI-MODE WIRELESS TRANSMIT/RECEIVE UNIT

(75) Inventors: Kamel M. Shaheen, King of Prussia, PA (US); Stephen E. Terry, Northpoint, NY (US); Brian Gregory Kiernan, Downingtown, PA (US)

(73) Assignee: InterDigital Technology Corporation, Inc., Wilmington, DE (US)

( * ) Notice: Subject to any disclaimer, the term of this patent is extended or adjusted under 35 U.S.C. 154(b) by 0 days.

(21) Appl. No.: 13/084,266

(22) Filed: Apr. 11, 2011

(65) Prior Publication Data
US 2011/0182270 A1 Jul. 28, 2011

Related U.S. Application Data

(63) Continuation of application No. 11/077,913, filed on Mar. 11, 2005, now Pat. No. 7,924,785.

(60) Provisional application No. 60/552,561, filed on Mar. 12, 2004.

(51) Int. Cl.
*H04L 12/50* (2006.01)
*H04W 36/00* (2009.01)
(Continued)

(52) U.S. Cl.
CPC .......... *H04W 36/0061* (2013.01); *H04W 36/04* (2013.01); *H04W 36/14* (2013.01);
(Continued)

(58) Field of Classification Search
CPC ............ H04W 36/00; H04W 36/0005; H04W 36/0011; H04W 36/0055; H04W 36/0066; H04W 36/0072; H04W 36/0077; H04W 36/0088

USPC ........... 370/331, 335, 342, 912–914; 455/62, 455/432.1, 450, 452, 1, 452.2, 2, 436; 709/217–230
See application file for complete search history.

(56) References Cited

U.S. PATENT DOCUMENTS 3,952,610 A 4/1976 Hope et al.
5,530,917 A 6/1996 Andersson et al.
(Continued)

FOREIGN PATENT DOCUMENTS

CN 1249113 A 3/2000
CN 1335701 A 2/2002
(Continued)

OTHER PUBLICATIONS

ETSI. "Universal Mobile Telecommunications System (UMTS); Feasibility Study on 3GPP System to Wireless Local Area network (WLAN) Interworking." 3GPP TR 22.934 v6.2.0, pp. 1-32.
(Continued)

*Primary Examiner* — Dmitry H Levitan
(74) *Attorney, Agent, or Firm* — Condo Roccia Koptiw LLP

(57) ABSTRACT

A method and system for switching a radio access technology (RAT) between wireless communication systems connected to each other while implementing different RATs with a multi-mode WTRU are disclosed. A plurality of wireless communication systems are deployed with overlapping coverage areas wherein each system implements different RATs and are connected to each other such that a service that is provided by one system may be provided through the other system. Each wireless communication system transmits an indication of the existence of an inter-working wireless communication system in a coverage area of each system. The WTRU receives the indication and information regarding the inter-working wireless communication system. The WTRU then initiates a handoff to the inter-working wireless communication system using the received information, whereby the WTRU continues to receive the same services that the WTRU receives from the currently connected wireless communication system through the inter-working wireless communication system.

16 Claims, 2 Drawing Sheets

(51) Int. Cl.

| | |
|---|---|
| *H04W 36/04* | (2009.01) |
| *H04W 36/14* | (2009.01) |
| *H04W 48/18* | (2009.01) |
| *H04W 48/20* | (2009.01) |
| *H04W 84/12* | (2009.01) |
| *H04W 88/06* | (2009.01) |
| *H04W 92/02* | (2009.01) |

(52) U.S. Cl.
CPC .............. *H04W 48/18* (2013.01); *H04W 48/20* (2013.01); *H04W 84/12* (2013.01); *H04W 88/06* (2013.01); *H04W 92/02* (2013.01)

(56) References Cited

U.S. PATENT DOCUMENTS

| | | | |
|---|---|---|---|
| 5,611,050 A | 3/1997 | Theimer et al. | |
| 5,666,650 A | 9/1997 | Turcotte et al. | |
| 5,787,347 A | 7/1998 | Yu et al. | |
| 5,790,954 A | 8/1998 | Tayloe et al. | |
| 5,826,188 A | 10/1998 | Tayloe et al. | |
| 5,862,480 A | 1/1999 | Wild et al. | |
| 5,903,840 A | 5/1999 | Bertacchi | |
| 5,930,700 A | 7/1999 | Pepper et al. | |
| 5,946,634 A | 8/1999 | Korpela | |
| 5,999,816 A | 12/1999 | Tiedemann et al. | |
| 6,011,973 A | 1/2000 | Valentine et al. | |
| 6,057,782 A | 5/2000 | Koenig | |
| 6,061,565 A | 5/2000 | Innes et al. | |
| 6,112,093 A | 8/2000 | Nordlund | |
| 6,115,608 A | 9/2000 | Duran et al. | |
| 6,128,490 A | 10/2000 | Shaheen et al. | |
| 6,161,015 A | 12/2000 | Birchler et al. | |
| 6,188,898 B1 | 2/2001 | Phillips et al. | |
| 6,201,968 B1 | 3/2001 | Ostroff et al. | |
| 6,201,973 B1 | 3/2001 | Kowaguchi | |
| 6,243,581 B1 | 6/2001 | Jawanda | |
| 6,304,755 B1 | 10/2001 | Tiedemann et al. | |
| 6,353,602 B1 | 3/2002 | Cheng et al. | |
| 6,385,772 B1 | 5/2002 | Courtney | |
| 6,400,265 B1 | 6/2002 | Saylor et al. | |
| 6,400,951 B1 | 6/2002 | Vaara | |
| 6,470,184 B1 | 10/2002 | Machida | |
| 6,487,410 B1 | 11/2002 | Kontio et al. | |
| 6,546,246 B1 | 4/2003 | Bridges et al. | |
| 6,591,103 B1 | 7/2003 | Dunn et al. | |
| 6,594,242 B1 | 7/2003 | Kransmo | |
| 6,597,911 B1 | 7/2003 | Kransmo | |
| 6,600,758 B1 | 7/2003 | Mazur et al. | |
| 6,615,048 B1 | 9/2003 | Hayashi | |
| 6,643,513 B2 | 11/2003 | Timonen et al. | |
| 6,668,175 B1 | 12/2003 | Almgren et al. | |
| 6,680,923 B1 | 1/2004 | Leon | |
| 6,718,178 B1 | 4/2004 | Sladek et al. | |
| 6,721,565 B1 | 4/2004 | Ejzak et al. | |
| 6,735,433 B1 | 5/2004 | Cervantes | |
| 6,747,968 B1 | 6/2004 | Seppala et al. | |
| 6,768,726 B2 | 7/2004 | Dorenbosch et al. | |
| 6,771,964 B1 | 8/2004 | Einola et al. | |
| 6,801,772 B1 | 10/2004 | Townend et al. | |
| 6,801,786 B1 * | 10/2004 | Korpela ...................... | 455/552.1 |
| 6,826,154 B2 | 11/2004 | Subbiah et al. | |
| 6,829,481 B2 | 12/2004 | Souissi | |
| 6,832,093 B1 | 12/2004 | Ranta | |
| 6,845,238 B1 | 1/2005 | Muller | |
| 6,894,988 B1 | 5/2005 | Zehavi | |
| 6,961,561 B2 | 11/2005 | Himmel et al. | |
| 6,963,745 B2 | 11/2005 | Singh et al. | |
| 6,973,309 B1 | 12/2005 | Rygula et al. | |
| 6,983,149 B2 | 1/2006 | Lindquist et al. | |
| 7,006,828 B1 | 2/2006 | Czaja et al. | |
| 7,009,952 B1 | 3/2006 | Razavilar et al. | |
| 7,016,306 B2 * | 3/2006 | Alapuranen et al. .......... | 370/238 |
| 7,016,691 B2 | 3/2006 | Yaguchi et al. | |
| 7,054,634 B2 | 5/2006 | Watanabe et al. | |
| 7,089,008 B1 | 8/2006 | Back et al. | |
| 7,092,710 B1 | 8/2006 | Stoter et al. | |
| 7,092,743 B2 | 8/2006 | Vegh | |
| 7,096,015 B2 | 8/2006 | Bridges et al. | |
| 7,133,384 B2 | 11/2006 | Park et al. | |
| 7,145,890 B1 | 12/2006 | Seo et al. | |
| 7,146,130 B2 | 12/2006 | Hsu et al. | |
| 7,146,636 B2 | 12/2006 | Crosbie | |
| 7,149,521 B2 | 12/2006 | Sundar et al. | |
| 7,155,225 B2 | 12/2006 | Segal et al. | |
| 7,161,914 B2 * | 1/2007 | Shoaib et al. ................. | 370/331 |
| 7,164,923 B2 | 1/2007 | Tsunomoto et al. | |
| 7,181,218 B2 | 2/2007 | Ovesjo et al. | |
| 7,194,273 B2 | 3/2007 | Vaudreuil | |
| 7,200,401 B1 | 4/2007 | Hulkkonen et al. | |
| 7,206,318 B2 | 4/2007 | Keller | |
| 7,221,929 B2 * | 5/2007 | Lee et al. ...................... | 455/408 |
| 7,239,620 B2 | 7/2007 | Storm et al. | |
| 7,254,119 B2 | 8/2007 | Jiang et al. | |
| 7,263,367 B1 | 8/2007 | Sabot | |
| 7,283,507 B2 | 10/2007 | Buckley et al. | |
| 7,376,098 B2 | 5/2008 | Loeffler et al. | |
| 7,418,267 B2 | 8/2008 | Karaoguz | |
| 7,436,804 B2 | 10/2008 | O'Neill | |
| 7,437,154 B2 | 10/2008 | Hahn | |
| 7,486,635 B2 | 2/2009 | Okanoue et al. | |
| 7,508,799 B2 | 3/2009 | Sumner et al. | |
| 7,551,576 B2 * | 6/2009 | Ahmavaara ................... | 370/328 |
| 7,567,806 B2 * | 7/2009 | Vare et al. ...................... | 455/436 |
| 7,590,708 B2 * | 9/2009 | Hsu .............................. | 709/218 |
| 7,599,379 B2 * | 10/2009 | Kelly et al. ................... | 370/401 |
| 7,610,049 B2 | 10/2009 | Watanabe | |
| 7,835,742 B2 * | 11/2010 | Jaakkola et al. .............. | 455/436 |
| 7,984,149 B1 | 7/2011 | Grayson et al. | |
| 8,023,941 B2 | 9/2011 | Shaheen et al. | |
| 8,331,907 B2 | 12/2012 | Jiang et al. | |
| 8,548,478 B2 | 10/2013 | Ozluturk | |
| 8,787,361 B2 | 7/2014 | Carlton et al. | |
| 2002/0022478 A1 | 2/2002 | Iwao | |
| 2002/0024937 A1 | 2/2002 | Barnard et al. | |
| 2002/0025810 A1 | 2/2002 | Takayama et al. | |
| 2002/0032034 A1 | 3/2002 | Tiedemann et al. | |
| 2002/0032748 A1 | 3/2002 | Myojo | |
| 2002/0068570 A1 | 6/2002 | Abrol et al. | |
| 2002/0082044 A1 | 6/2002 | Davenport | |
| 2002/0120749 A1 | 8/2002 | Widegren et al. | |
| 2002/0136226 A1 | 9/2002 | Christoffel et al. | |
| 2002/0146021 A1 | 10/2002 | Schwartz et al. | |
| 2002/0147008 A1 | 10/2002 | Kallio | |
| 2002/0147012 A1 | 10/2002 | Leung et al. | |
| 2002/0151304 A1 | 10/2002 | Hogan | |
| 2002/0161921 A1 | 10/2002 | Kurakake et al. | |
| 2002/0180582 A1 | 12/2002 | Nielsen | |
| 2003/0002525 A1 | 1/2003 | Grilli et al. | |
| 2003/0003933 A1 | 1/2003 | Deshpande et al. | |
| 2003/0012156 A1 | 1/2003 | Fukuda | |
| 2003/0013443 A1 | 1/2003 | Willars et al. | |
| 2003/0013463 A1 | 1/2003 | Yen | |
| 2003/0022740 A1 | 1/2003 | You | |
| 2003/0045322 A1 | 3/2003 | Baer et al. | |
| 2003/0046546 A1 | 3/2003 | Endo | |
| 2003/0054809 A1 | 3/2003 | Bridges et al. | |
| 2003/0080996 A1 | 5/2003 | Lavin et al. | |
| 2003/0081567 A1 | 5/2003 | Okanoue et al. | |
| 2003/0092444 A1 | 5/2003 | Sengodan et al. | |
| 2003/0100307 A1 | 5/2003 | Wolochow et al. | |
| 2003/0114158 A1 | 6/2003 | Soderbacka et al. | |
| 2003/0118015 A1 | 6/2003 | Gunnarsson et al. | |
| 2003/0119480 A1 | 6/2003 | Mohammed | |
| 2003/0123479 A1 | 7/2003 | Lee et al. | |
| 2003/0125028 A1 | 7/2003 | Reynolds | |
| 2003/0142641 A1 | 7/2003 | Sumner et al. | |
| 2003/0144001 A1 | 7/2003 | Nakatsugawa et al. | |
| 2003/0147364 A1 | 8/2003 | Watanabe et al. | |
| 2003/0148777 A1 | 8/2003 | Watanabe et al. | |
| 2003/0148786 A1 | 8/2003 | Cooper et al. | |
| 2003/0149875 A1 | 8/2003 | Hosaka | |
| 2003/0163558 A1 | 8/2003 | Cao et al. | |
| 2003/0174667 A1 | 9/2003 | Krishnamurthi et al. | |

(56) References Cited

U.S. PATENT DOCUMENTS

| | | |
|---|---|---|
| 2003/0179726 A1 | 9/2003 | Forssell et al. |
| 2003/0206533 A1 | 11/2003 | Charas |
| 2003/0208602 A1 | 11/2003 | Bhalla et al. |
| 2003/0218995 A1 | 11/2003 | Kim et al. |
| 2003/0227911 A1 | 12/2003 | Trossen et al. |
| 2004/0002343 A1 | 1/2004 | Brauel et al. |
| 2004/0008645 A1 | 1/2004 | Janevski et al. |
| 2004/0014474 A1 | 1/2004 | Kanada |
| 2004/0018829 A1 | 1/2004 | Raman et al. |
| 2004/0028009 A1 | 2/2004 | Dorenbosch et al. |
| 2004/0029587 A1 | 2/2004 | Hulkkonen et al. |
| 2004/0033805 A1 | 2/2004 | Verma et al. |
| 2004/0058717 A1 | 3/2004 | McDonnell et al. |
| 2004/0063426 A1 | 4/2004 | Hunkeler |
| 2004/0068571 A1 | 4/2004 | Ahmavaara |
| 2004/0090937 A1 | 5/2004 | Chaskar et al. |
| 2004/0092259 A1 | 5/2004 | Blanc et al. |
| 2004/0100913 A1 | 5/2004 | Kalliokulju et al. |
| 2004/0103204 A1 | 5/2004 | Yegin |
| 2004/0105434 A1 | 6/2004 | Baw |
| 2004/0114553 A1 | 6/2004 | Jiang et al. |
| 2004/0127241 A1 | 7/2004 | Shostak |
| 2004/0127263 A1 | 7/2004 | Vegh et al. |
| 2004/0152480 A1 | 8/2004 | Willars et al. |
| 2004/0157600 A1 | 8/2004 | Stumpert et al. |
| 2004/0176103 A1 | 9/2004 | Trossen et al. |
| 2004/0185845 A1 | 9/2004 | Abhishek et al. |
| 2004/0192221 A1 | 9/2004 | Matsunaga |
| 2004/0203732 A1 | 10/2004 | Brusilovsky et al. |
| 2004/0203748 A1 | 10/2004 | Kappes et al. |
| 2004/0203773 A1 | 10/2004 | Balasubramanian et al. |
| 2004/0203792 A1 | 10/2004 | Shaheen et al. |
| 2004/0203873 A1 | 10/2004 | Gray |
| 2004/0203890 A1 | 10/2004 | Karaoguz et al. |
| 2004/0218605 A1 | 11/2004 | Gustafsson et al. |
| 2004/0235455 A1 | 11/2004 | Jiang |
| 2004/0264410 A1 | 12/2004 | Sagi et al. |
| 2004/0264414 A1 | 12/2004 | Dorenbosch |
| 2005/0025164 A1 | 2/2005 | Kavanagh et al. |
| 2005/0047373 A1 | 3/2005 | Kojima |
| 2005/0059410 A1 | 3/2005 | Trossen et al. |
| 2005/0064877 A1 | 3/2005 | Gum et al. |
| 2005/0070289 A1 | 3/2005 | Vestama et al. |
| 2005/0090259 A1 | 4/2005 | Jain et al. |
| 2005/0107085 A1 | 5/2005 | Ozluturk |
| 2005/0107093 A1 | 5/2005 | Dowling |
| 2005/0107100 A1 | 5/2005 | Gustafsson et al. |
| 2005/0136898 A1 | 6/2005 | Shaheen et al. |
| 2005/0153698 A1 | 7/2005 | Sahim et al. |
| 2005/0153725 A1 | 7/2005 | Naghian et al. |
| 2005/0164704 A1 | 7/2005 | Winsor et al. |
| 2005/0176445 A1 | 8/2005 | Qu et al. |
| 2005/0177733 A1 | 8/2005 | Stadelmann et al. |
| 2005/0181776 A1 | 8/2005 | Verma et al. |
| 2005/0202791 A1 | 9/2005 | Krause et al. |
| 2005/0202823 A1 | 9/2005 | Shaheen et al. |
| 2005/0202828 A1 | 9/2005 | Pecen et al. |
| 2005/0237963 A1 | 10/2005 | Storm |
| 2005/0250491 A1 | 11/2005 | Roy |
| 2005/0271013 A1 | 12/2005 | Shaheen |
| 2005/0288019 A1 | 12/2005 | Park et al. |
| 2006/0004643 A1 | 1/2006 | Stradelmann et al. |
| 2006/0052100 A1 | 3/2006 | Almgren |
| 2006/0056448 A1 | 3/2006 | Zaki et al. |
| 2006/0059232 A1 | 3/2006 | Yoshikawa |
| 2006/0077926 A1 | 4/2006 | Rune et al. |
| 2006/0077986 A1 | 4/2006 | Rune et al. |
| 2006/0084440 A1 | 4/2006 | Bakri |
| 2006/0105766 A1 | 5/2006 | Azada et al. |
| 2006/0194582 A1 | 8/2006 | Cooper |
| 2006/0270411 A1 | 11/2006 | Grayson |
| 2006/0276190 A1 | 12/2006 | Shaheen |
| 2006/0291455 A1 | 12/2006 | Katz et al. |
| 2006/0293053 A1 | 12/2006 | Zanaty |
| 2007/0004454 A1 | 1/2007 | Schweiger et al. |
| 2007/0021120 A1 | 1/2007 | Flore et al. |
| 2007/0072603 A1 | 3/2007 | Wang |
| 2007/0082699 A1 | 4/2007 | Karaoguz et al. |
| 2007/0093201 A1 | 4/2007 | Hsu et al. |
| 2007/0112948 A1 | 5/2007 | Uhlik |
| 2007/0208864 A1 | 9/2007 | Flynn et al. |
| 2007/0217366 A1 | 9/2007 | Sagi et al. |
| 2007/0224988 A1 | 9/2007 | Shaheen |
| 2007/0259653 A1 | 11/2007 | Tang et al. |
| 2007/0270572 A1 | 11/2007 | Manjunatha et al. |
| 2008/0101291 A1 | 5/2008 | Jiang et al. |
| 2008/0240036 A1 | 10/2008 | Liu et al. |
| 2009/0131053 A1 | 5/2009 | Sachs et al. |
| 2009/0170519 A1 | 7/2009 | Wilhoite et al. |
| 2011/0182270 A1 | 7/2011 | Shaheen et al. |
| 2015/0024755 A1 | 1/2015 | Shaheen |
| 2015/0065141 A1 | 3/2015 | Ma et al. |

FOREIGN PATENT DOCUMENTS

| | | |
|---|---|---|
| CN | 1398495 A | 2/2003 |
| EP | 0 852 448 | 7/1998 |
| EP | 0 936 777 | 8/1999 |
| EP | 1 081 909 | 3/2001 |
| EP | 1 178 646 | 2/2002 |
| EP | 1 213 941 | 6/2002 |
| EP | 1 253 796 | 10/2002 |
| EP | 1 257 141 | 11/2002 |
| EP | 1 278 143 | 1/2003 |
| EP | 1 395 076 | 3/2004 |
| EP | 1 424 862 | 6/2004 |
| EP | 1467587 A1 | 10/2004 |
| EP | 1566983 A2 | 8/2005 |
| EP | 1 597 868 | 11/2005 |
| EP | 1884127 A2 | 2/2008 |
| GB | 2 322 051 | 8/1998 |
| GB | 2 352 586 | 6/1999 |
| GB | 2 377 130 | 12/2002 |
| GB | 2 390 777 | 1/2004 |
| GB | 2 391 432 | 2/2004 |
| JP | 10-004580 | 1/1998 |
| JP | 2000-092541 | 3/2000 |
| JP | 2000-270356 | 9/2000 |
| JP | 2001-008251 A | 1/2001 |
| JP | 2001-258058 | 9/2001 |
| JP | 2003-259457 A | 9/2003 |
| JP | 2003-264868 | 9/2003 |
| JP | 2004-201001 A | 7/2004 |
| JP | 2004-304399 A | 10/2004 |
| JP | 2004-320473 | 11/2004 |
| JP | 2004-349976 | 12/2004 |
| JP | 2005-295332 | 10/2005 |
| JP | 2006-501785 A | 1/2006 |
| JP | 2006-524448 A | 10/2006 |
| JP | 2007-503745 A | 2/2007 |
| JP | 2007-529920 A | 10/2007 |
| JP | 2008-507217 A | 3/2008 |
| JP | 2008-512452 A | 4/2008 |
| JP | 2008-541670 A | 11/2008 |
| JP | 2011-120511 A | 6/2011 |
| JP | 2011-234378 A | 11/2011 |
| KR | 2000-0060796 | 10/2000 |
| KR | 2002-0037564 | 5/2002 |
| KR | 2002-0073997 | 9/2002 |
| KR | 2004-0051329 | 6/2004 |
| KR | 10-2005-0053869 A | 6/2005 |
| KR | 10-2013-0139372 A | 12/2013 |
| TW | 243573 | 3/1995 |
| TW | 300943 | 3/1997 |
| TW | 2011-23942 A | 7/2011 |
| WO | 96/36190 | 11/1996 |
| WO | 99/67902 | 12/1999 |
| WO | 00/04718 | 1/2000 |
| WO | 00/60895 | 10/2000 |
| WO | 00/65802 | 11/2000 |
| WO | 01/28154 | 4/2001 |
| WO | 01/31963 | 5/2001 |
| WO | 01/35585 | 5/2001 |
| WO | 01/58177 | 8/2001 |

(56) References Cited

FOREIGN PATENT DOCUMENTS

| WO | 01/69858 | 9/2001 |
|---|---|---|
| WO | WO 01/91420 A2 | 11/2001 |
| WO | 02/11358 | 2/2002 |
| WO | 02/13157 | 2/2002 |
| WO | 02/30133 | 4/2002 |
| WO | 02/062094 | 8/2002 |
| WO | WO 2002/063900 A1 | 8/2002 |
| WO | 02/080605 | 10/2002 |
| WO | WO 2002/085060 A2 | 10/2002 |
| WO | WO 2002/087160 A2 | 10/2002 |
| WO | WO 2002/093955 A1 | 11/2002 |
| WO | 03/003639 | 1/2003 |
| WO | 03/024144 | 3/2003 |
| WO | 03/045095 | 5/2003 |
| WO | 03/054721 | 7/2003 |
| WO | 03/079660 | 9/2003 |
| WO | 2004/006482 | 1/2004 |
| WO | WO 2004/004402 A1 | 1/2004 |
| WO | 2004/089021 | 10/2004 |
| WO | 2004/100452 | 11/2004 |
| WO | WO 2005/015938 A1 | 2/2005 |
| WO | 2005/027556 | 3/2005 |
| WO | WO 2005/019961 A2 | 3/2005 |
| WO | 2005/051026 | 6/2005 |
| WO | WO 2005/089009 A1 | 9/2005 |
| WO | WO 2005/089249 A2 | 9/2005 |
| WO | 2006/020168 | 2/2006 |

OTHER PUBLICATIONS

IEEE P802.21/D01.00, Mar. 2006, Draft IEEE Standard for Local and Metropolitan Area Networks: Media Independent Handover Services.
Jassemuddin, "An Architecture for Integrating UMTS and 802.11 WLAN Networks." Proceedings of the 8$^{th}$ IEEE International Symposium on Computers and Communication, 2003, pp. 716-723.
Morand et al., "Global Mobility Approach with Mobile IP in "All IP" Networks," IEEE International Conference on Communications, ICC 2002, vol. 4, pp. 2075-2079, (2002).
Parkvall, "Long-Term 3G Radio Access," Ericsson Research (Nov. 12, 2005).
Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4), "3GPP TS 44.060 v4.15.0 (Feb. 2004).
Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4), "3GPP TS 44.060 V4.20.0 (Feb. 2005).
Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5. 10.0 (Feb. 2004).
Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5), " 3GPP TS 44.060 V5. 15.0 (Feb. 2005).
Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6)," 3GPP TS 44.060 V6.6.0 (Feb. 2004).
Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6)," 3GPP TS 44.060 V6.11.1 (Feb. 2005).
Third Generation Partnership Project, "Technical Specification Group Services and System Aspects; 3GPP system to Wireless Local Area Network (WLAN) interworking; System description (Release 6)," 3GPP TS 23.234 V6.3.0 (Jan. 2005).
Third Generation Partnership Project, "Technical Specification Group Radio Access Network; Radio Resource Control (RRC); Protocol Specification (Release 4)," 3GPP TS 25.331 V4.12.0 (Jan. 2004).
Third Generation Partnership Project, "Technical Specification Group Radio Access Network; Radio Resource Control (RRC); Protocol Specification (Release 4)," 3GPP TS 25.331 V4.16.0 (Dec. 2004).
Third Generation Partnership Project, "Technical Specification Group Radio Access Network; Radio Resource Control (RRC); Protocol Specification (Release 5)," 3GPP TS 25.331 V5.7.1 (Jan. 2004).
Third Generation Partnership Project, "Technical Specification Group Radio Access Network; Radio Resource Control (RRC); Protocol Specification (Release 5)," 3GPP TS 25.331 V5.11.0 (Dec. 2004).
Third Generation Partnership Project, "Technical Specification Group Radio Access Network; Radio Resource Control (RRC); Protocol Specification (Release 6)," 3GPP TS 25.331 V6.0.0 (Jan. 2004).
Third Generation Partnership Project, "Technical Specification Group Radio Access Network; Radio Resource Control (RRC); Protocol Specification (Release 6)," 3GPP TS 25.331 V6.4.0 (Dec. 2004).
Third Generation Partnership Project, "Technical Specification Group Services and System Aspects; 3GPP system to Wireless Local Area Network (WLAN) interworking; System description (Release 6)," 3GPP TS 23.234 V2.4.0 (Jan. 2004).
UMA Architecture (Stage 2) R1.0.4, May 2, 2005, Unlicensed Mobile Access (UMA); Architecture (Stage 2).
Zhang et al., "Integration of Wireless LAN and 3G Wireless—Efficianet Mobility Management for Vertical Handoff between WWAN and WLAN,".
Palviainen (TSG-N2 chairman), "Summary Report of the TSG-N2 to TSG-N Plenary Meeting #9," 3GPP TSG CN #9, NP 000451 (Sep. 20-22, 2000). 3 pages.
3rd Generation Partnership Project (3GPP), R2-040733, "Reply to: LS on Use of UTRAN for I-WLAN [S1-040190]", TSG RAN2#41, Malaga, Spain, Feb. 2004, 2 pages.
3rd Generation Partnership Project (3GPP), S2-041207, "Discussion paper on UTRAN Assisted Network Selection", InterDigital Communication, 3GPP TSG SA2#39, Shenzhen, China, Apr. 19-23, 2004, 2 pages, one page.
3rd Generation Partnership Project (3GPP), TDOCS2-041208, "UTRAN Assisted Network Selection", InterDigital Communication, 3GPP TSG-SA2 Meeting #39, Shenzhen, China, Apr. 19-23, 2004, 3 pages, 5 pages.
3rd Generation Partnership Project (3GPP), TR 22.934 V1.0.0, "Feasibility study on 3GPP System to Wireless Local Area Network (WLAN) Interworking", TSGS#15(02)0059, Technical Specification Group Services and System Aspects Meeting #15, Cheju Island, Korea, Mar. 2002, 13 pages.
3rd Generation Partnership Project (3GPP), TR 22.934 V6.0.0, "Technical Specification Group Services and System Aspects, Feasibility study on 3GPP System to Wireless Local Area Network (WLAN) Interworking (Release 6)", Sep. 2002, 29 pages.
3rd Generation Partnership Project (3GPP), TR 23.882 V1.1.0, "Technical Specification Group Services and System Aspects, 3GPP System Architecture Evolution: Report on Technical Options and Conclusions (Release 7)", Apr. 2006, 130 pages.
3rd Generation Partnership Project (3GPP), TS 23.234 V1.0.0, "Technical Specification Group Services and System Aspects, WLAN Subsystem, System Description (Release 6)", Sep. 2002, 36 pages.
3rd Generation Partnership Project (3GPP), TS 23.234 V2.0.0, "Technical Specification Group Services and System Aspects, 3GPP system to Wireless Local Area Network (WLAN) Interworking, System Description (Release 6)", Sep. 2003, 68 pages.
3rd Generation Partnership Project (3GPP), TS 23.234 V6.2.0, "Technical Specification Group Services and System Aspects, 3GPP

(56) References Cited

OTHER PUBLICATIONS

System to Wireless Local Area Network (WLAN) Interworking, System Description (Release 6)", Sep. 2004, 97 pages.
3rd Generation Partnership Project (3GPP), TS 23.234 V6.4.0, "Technical Specification Group Services and System Aspects, 3GPP system to Wireless Local Area Network (WLAN) Interworking, System description (Release 6)", Mar. 2005, 78 pages.
3rd Generation Partnership Project (3GPP), TS 23.234 V6.8.0, "Technical Specification Group Services and System Aspects, 3GPP system to Wireless Local Area Network (WLAN) interworking, System description (Release 6)", Mar. 2006, 80 pages.
3rd Generation Partnership Project (3GPP), TS 23.234 V7.1.0, "Technical Specification Group Services and System Aspects, 3GPP system to Wireless Local Area Network (WLAN) Interworking, System description (Release 7)", Mar. 2006, 81 pages.
3rd Generation Partnership Project (3GPP), TS 25.331 V3.21.0, "Technical Specification Group Radio Access Network, Radio Resource Control (RRC), Protocol Specification (Release 1999)", Dec. 2004, 879 pages.
3rd Generation Partnership Project (3GPP), TS 25.331 V4.11.0, "Technical Specification Group Radio Access Network, Radio Resource Control (RRC), Protocol Specification (Release 4)", Sep. 2003, 945 pages.
3rd Generation Partnership Project (3GPP), TS 25.331 V4.17.0, "Technical Specification Group Radio Access Network, Radio Resource Control (RRC), Protocol Specification (Release 4)", Mar. 2005, 953 pages.
3rd Generation Partnership Project (3GPP), TS 25.331 V4.5.0, "Technical Specification Group Radio Access Network, Radio Resource Control (RRC), Protocol Specification (Release 4)", Jun. 2002, 838 pages.
3rd Generation Partnership Project (3GPP), TS 25.331 V4.7.0, "Technical Specification Group Radio Access Network, Radio Resource Control (RRC), Protocol Specification, (Release 4)", Sep. 2002, 913 pages.
3rd Generation Partnership Project (3GPP), TS 25.331 V5.1.0, "Technical Specification Group Radio Access Network, Radio Resource Control (RRC), Protocol Specification (Release 5)", Jun. 2002, 921 pages.
3rd Generation Partnership Project (3GPP), TS 25.331 V5.10.0, "Technical Specification Group Radio Access Network, Radio Resource Control (RRC), Protocol Specification (Release 5)", Sep. 2004, 1047 pages.
3rd Generation Partnership Project (3GPP), TS 25.331 V5.12.1, "Technical Specification Group Radio Access Network, Radio Resource Control (RRC), Protocol Specification (Release 5)", Mar. 2005,1057 pages.
3rd Generation Partnership Project (3GPP), TS 25.331 V5.16.0, "Technical Specification Group Radio Access Network, Radio Resource Control (RRC), Protocol Specification (Release 5)", Mar. 2006, 1046 pages.
3rd Generation Partnership Project (3GPP), TS 25.331 V5.6.0, "Technical Specification Group Radio Access Network, Radio Resource Control (RRC), Protocol Specification (Release 5)", Sep. 2003, 1006 pages.
3rd Generation Partnership Project (3GPP), TS 25.331 V6.3.0, "Technical Specification Group Radio Access Network, Radio Resource Control (RRC), Protocol Specification (Release 6)", Sep. 2004, 1048 pages.
3rd Generation Partnership Project (3GPP), Ts 25.331 V6.5.0, "Technical Specification Group Radio Access Network, Radio Resource Control (RRC), Protocol Specification (Release 6)", Mar. 2005, 1145 pages.
3rd Generation Partnership Project (3GPP), TS 25.331 V6.9.0, "Technical Specification Group Radio Access Network, Radio Resource Control (RRC), Protocol Specification (Release 6)", Mar. 2006, 1209 pages.
3rd Generation Partnership Project (3GPP), TS 25.331 V7.0.0, "Technical Specification Group Radio Access Network, Radio Resource Control (RRC), Protocol Specification (Release 7)", Mar. 2006, 1249 pages.
3rd Generation Partnership Project (3GPP), TS 44.060 V4.13.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 4)", Sep. 2003, 321 pages.
3rd Generation Partnership Project (3GPP), TS 44.060 V4.18.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 4)", Sep. 2004, 324 pages.
3rd Generation Partnership Project (3GPP), TS 44.060 V4.6.1, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 4)", May 2002, 323 pages.
3rd Generation Partnership Project (3GPP), TS 44.060 V4.8.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 4)", Sep. 2002, 322 pages.
3rd Generation Partnership Project (3GPP), TS 44.060 V5.1.1, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 5)", May 2002, 306 Pages.
3rd Generation Partnership Project (3GPP), TS 44.060 V5.13.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 5)", Sep. 2004, 345 pages.
3rd Generation Partnership Project (3GPP), TS 44.060 V5.3.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 5)", Sep. 2002, 332 pages.
3rd Generation Partnership Project (3GPP), TS 44.060 V5.8.0, "Technical Specification Group GSM/EDGE Radio Access Network, General Packet Radio Service (GPRS), Mobile Station (MS)—Base Station System (BSS) Interface; Radio Link Control/Medium Access Control (RLC/MAC) Protocol (Release 5)", Sep. 2003, 341 pages.
3rd Generation Partnership Project (3GPP), TS 44.060 V6.4.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 6)", Sep. 2003, 354 pages.
3rd Generation Partnership Project (3GPP), TS 44.060 V6.9.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 6)", Sep. 2004, 366 pages.
Gustafsson et al., "Always Best Connected", Wireless Communications, IEEE, vol. 10, No. 1, Feb. 2003, pp. 49-55.
3rd Generation Partnership Project (3GPP), TR 23.882 V0.10.0, "Technical Specification Group Services and System Aspects, 3GPP System Architecture Evolution, Report on Technical Options and Conclusions", Jan. 2006, pp. 1-96.
3rd Generation Partnership Project (3GPP), TS 01.01 V3.0.0, "Technical Specification Group Services and System Aspects, Technical

(56) References Cited

OTHER PUBLICATIONS

Specifications and Technical Reports for a GERAN-Based 3GPP System (Phase 1)", Jun. 2003, pp. 1-8.
3rd Generation Partnership Project (3GPP), TS 23.234 V6.7.0, "Technical Specification Group Services and System Aspects, 3GPP System to Wireless Local Area Network (WLAN) Interworking, System Description (Release 6)", Dec. 2005, pp. 1-80.
3rd Generation Partnership Project (3GPP), TS 23.234 V7.0.0, "Technical Specification Group Services and System Aspects, 3GPP System to Wireless Local Area Network (WLAN) Interworking, System Description (Release 7)", Dec. 2005, pp. 1-80.
3rd Generation Partnership Project (3GPP), TS 23.234 V7.4.0, "Technical Specification Group Services and System Aspects, 3GPP System to Wireless Local Area Network (WLAN) Interworking, System Description (Release 7)", Dec. 2006, pp. 1-85.
3rd Generation Partnership Project (3GPP), TS 23.402 V11.0.0, "Technical Specification Group Services and System Aspects, Architecture Enhancements for Non-3GPP Accesses (Release 11)", Sep. 2011, pp. 1-232.
3rd Generation Partnership Project (3GPP), TS 25.331 V5.15.0, "Technical Specification Group Radio Access Network, Radio Resource Control (RRC), Protocol Specification (Release 5)", Dec. 2005, pp. 1-1046.
3rd Generation Partnership Project (3GPP), TS 25.331 V5.19.0, "Technical Specification Group Radio Access Network, Radio Resource Control (RRC), Protocol Specification (Release 5)", Dec. 2006, pp. 1-1045.
3rd Generation Partnership Project (3GPP), TS 25.331 V6.12.0, "Technical Specification Group Radio Access Network, Radio Resource Control (RRC), Protocol Specification (Release 6)", Dec. 2006, pp. 1-560.
3rd Generation Partnership Project (3GPP), TS 25.331 V6.8.0, "Technical Specification Group Radio Access Network, Radio Resource Control (RRC), Protocol Specification (Release 6)", Dec. 2005, pp. 1-1174.
3rd Generation Partnership Project (3GPP), TS 25.331 V7.3.0, "Technical Specification Group Radio Access Network, Radio Resource Control (RRC), Protocol Specification (Release 7)", Dec. 2006, pp. 1-1316.
3rd Generation Partnership Project (3GPP), TS 44.060 V4.23.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol ( Release 4)", Nov. 2005, pp. 1-325.
3rd Generation Partnership Project (3GPP), TS 44.060 V5.18.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 5)", Nov. 2005, pp. 1-342.
3rd Generation Partnership Project (3GPP), TS 44.060 V6.16.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 6)", Jan. 2006, pp. 1-439.
3rd Generation Partnership Project (3GPP), TS 44.060 V6.20.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol, (Release 6)", Dec. 2006, pp. 1-446.
3rd Generation Partnership Project (3GPP), TS 44.060 V7.4.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) protocol (Release 7)", May 2006, pp. 1-446.
3rd Generation Partnership Project (3GPP), TS 44.060 V7.7.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) protocol (Release 7)", Dec. 2006, pp. 1-481.
3rd Generation Partnership Project (3GPP), TS 25.331 V4.17.0, "Technical Specification Group Radio Access Network, Radio Resource Control (RRC), Protocol Specification (Release 4)", Mar. 2005, pp. 1-953.

* cited by examiner

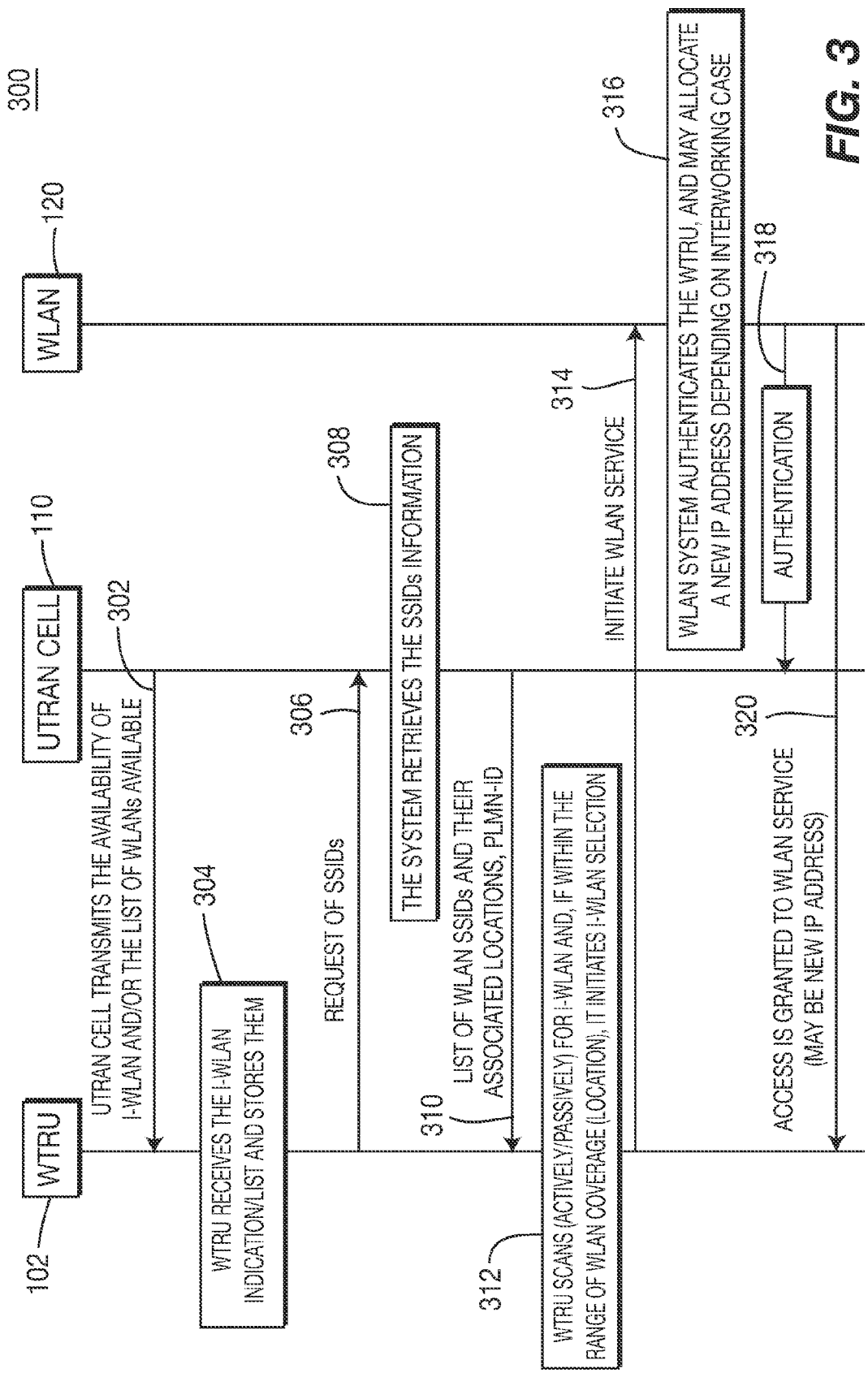

METHOD AND SYSTEM FOR SWITCHING A RADIO ACCESS TECHNOLOGY BETWEEN WIRELESS COMMUNICATION SYSTEMS WITH A MULTI-MODE WIRELESS TRANSMIT/RECEIVE UNIT

CROSS REFERENCE TO RELATED APPLICATION

This application is a continuation of U.S. patent application Ser. No. 11/077,913, filed Mar. 11, 2005, which claims the benefit of U.S. Provisional Application No. 60/552,561 filed Mar. 12, 2004, the contents of which are hereby incorporated by reference as if set forth in their entirety herein.

FIELD OF INVENTION

The present invention is related to a wireless communication system. More particularly, the present invention is a method and system for switching a radio access technology (RAT) between wireless communication systems being connected to each other while implementing different RATs with a multi-mode wireless transmit/receive unit (WTRU).

BACKGROUND

Universal mobile telecommunication systems (UMTS) and wireless local area network (WLAN) technologies are widely used in current wireless communication systems. Since the coverage areas of UMTS and WLANs are often overlapped, an inter-networking of UMTS and WLAN networks has been developed. An inter-working WLAN (I-WLAN) is a WLAN with a connection to a UMTS core network so that the services provided by the UMTS may be forwarded through the I-WLAN.

Currently, the network selection of an I-WLAN requires that a WTRU scan for available WLAN systems using their service set identifiers (SSIDs). The scanning of SSIDs can be done either passively or actively. In passive scanning, the WTRU observes information broadcast from each WLAN and determines its availability according to the signal strength. In active scanning, the WTRU transmits a probe request containing a specific WLAN SSID and waits for confirmation of the availability from that WLAN.

These techniques, however, do not provide any indication of the WLAN (SSID) that provides access to UMTS based services. Several solutions have been devised including broadcasting of the home public land mobile network (PLMN) identification over the WLAN broadcast channel. However, such techniques are vulnerable to spoofing, (disruptive WLAN operators may broadcast the same SSIDs and PLMN ID), since WLAN SSIDs are not unique.

Therefore, the selection of a UMTS based I-WLAN for connecting to UMTS based services can be a problem due to the large number of WLAN networks (SSIDs) that the WTRU must choose from and the ease of using similar SSIDs by disruptive operators in order to direct the traffic toward their networks. Accordingly, there is a need for a method and system for providing an indication of WLANs (SSIDs) that provide access to UMTS based services.

SUMMARY

The present invention is a method and system for switching a radio access technology (RAT) between wireless communication systems connected to each other while implementing different RATs with a multi-mode WTRU. A plurality of wireless communication systems are deployed with overlapping coverage areas wherein each wireless communication system implements different RATs and are connected to each other such that a service that is provided by one wireless communication system may be provided through the other wireless communication system. Each wireless communication system transmits an indication of the existence of an inter-working wireless communication system in a coverage area of each wireless communication system. The WTRU receives the indication and information regarding the inter-working wireless communication system. The WTRU then initiates a handoff to the inter-working wireless communication system using the received information, whereby the WTRU continues to receive the same services that the WTRU receives from the currently connected wireless communication system through the inter-working wireless communication system. The present invention helps reduce the time taken by the multi-mode WTRU to select and authenticate the inter-working wireless communication system.

BRIEF DESCRIPTION OF THE DRAWINGS

A more detailed understanding of the invention may be had from the following description of a preferred embodiment, given by way of example and to be understood in conjunction with the accompanying drawing wherein:

FIG. 3 is a signaling diagram of a process for exchanging messages among a WTRU, a UMTS terrestrial radio access network (UTRAN), and a WLAN for handoff from the UTRAN to the WLAN in accordance with the present invention.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminologies "base station" and "access point (AP)" include but are not limited to a Node-B, a site controller or any other type of interfacing device in a wireless environment.

Figure 1:
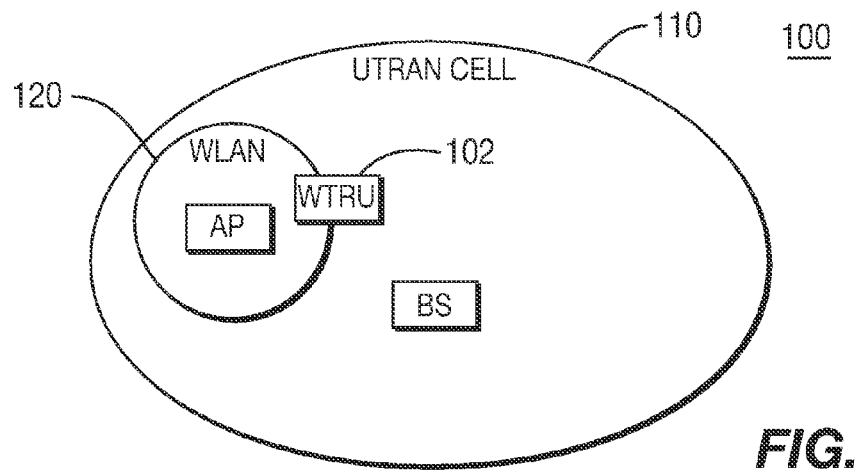
FIG. 1 is a block diagram of a wireless communication system in accordance with the present invention.

FIG. 1 is a block diagram of a wireless communication system 100 in accordance with the present invention. The system 100 comprises at least two different types of wireless communication networks 110, 120 implementing different radio access technologies (RATs). For example, as shown in FIG. 1, one type of wireless network is a UMTS terrestrial radio access network (UTRAN) (see UTRAN cell 110) preferably operating under third generation partnership project (3GPP) standards and the other type of wireless network is a WLAN 120 preferably operating under IEEE 802.11 standards. For purposes of describing the present invention, only one UTRAN cell 110 is shown. However, it is noted that, a UTRAN typically includes a plurality of cells, as known to those skilled in the art.

For convenience, the present invention is described with reference to a UTRAN and a WLAN. However, it should be noted that it is obvious to those skilled in the art that the present invention may be applied to any type of wireless communication system and further that there could be more than two different types of wireless communication networks.

Coverage areas of the wireless communication systems 110, 120 are overlapping with respect to each other. In a UTRAN-WLAN example, as is used herein, the coverage area of the WLAN 120 typically falls within the larger coverage area of a UTRAN cell 110. The WLAN 120 is connected to the UTRAN cell 110 so that the services provided within the UTRAN cell 10 may be forwarded to a multi-mode WTRU 102 through the WLAN 120. The WLAN 120 may therefore also be referred to as an I-WLAN, as explained above. A multi-mode WTRU 102 located in the overlapping area may access both types of wireless communication networks simultaneously, and may receive services provided by one network through the other network.

In accordance with the present invention, the UTRAN cell 110 sends an indication of the existence of any I-WLANs, or alternatively a list of service set identifiers (SSIDs) of the I-WLANs, located in the UTRAN cell 110 to the WTRU 102. The indication or the list of SSIDs may be transmitted as desired. For example, they may be broadcast via a broadcast control channel (BCCH) or may be sent via a dedicated control channel (DCCH). Where a system 100 is configured to transmit the indication or list over BCCHs, WTRUs may, but are not required to, provide their WLAN capability (i.e. whether or not they are capable of operating in a WLAN) upon connecting to the UTRAN cell 110 or upon establishment of a radio bearer. Where a system 100 is configured to transmit the indication or list over DCCHs, WTRUs are preferably required to provide their WLAN capability upon connecting to the UTRAN cell 110 or upon establishment of a radio bearer.

In accordance with a first embodiment, only an indication of the existence of any I-WLANs within the UTRAN cell 110 is transmitted. As mentioned above, the indication may be transmitted as desired, but is preferably transmitted over the cell's 110 broadcast control channel (BCCH) or over a dedicated control channel (DCCH). The WTRU 102 receives the indication and if a predetermined criteria for inter-system handoff (i.e. a predetermined criteria for handing over a WTRU 102 from the UTRAN cell 110 to the WLAN 120) is satisfied, the WTRU 102 requests the list of SSIDs from the UTRAN cell 110. It should be noted, of course, that the predetermined criteria may be any type of criteria and the evaluation of whether to actually perform an inter-system handoff may be evaluated by the WTRU 102 or by any of the network components of the network from which a handoff may occur, which in this case is a UTRAN.

Once the WTRU 102 receives the SSID list, the SSIDs are used, passively or actively, for scanning, association, and authentication of an appropriate AP within the I-WLAN 120. This scheme ensures that the WTRU 102 accesses the right WLAN AP that provides a connection to the UTRAN cell 110 and its 3GPP based services. Where the inter-system handoff criteria is met and there is an appropriate AP within the I-WLAN 120 to handoff to, the WTRU 102 is handed-off to the I-WLAN 120 and begins operating therein.

As an alternative, the WTRU 102 may request the list of SSIDs prior to evaluation of the inter-system handoff criteria in order to confirm whether there is an appropriate AP available prior to performing the evaluation.

In accordance with a second embodiment, the system 100 operates as mentioned above, but in this embodiment instead of first transmitting an indication of the existence of any I-WLANs within the UTRAN cell 110, the UTRAN cell 110 simply transmits the list of SSIDs. This may provide enhance performance where the number of SSIDs is not too high. Whether to implement the first or second embodiment is operator preference.

Figure 2:
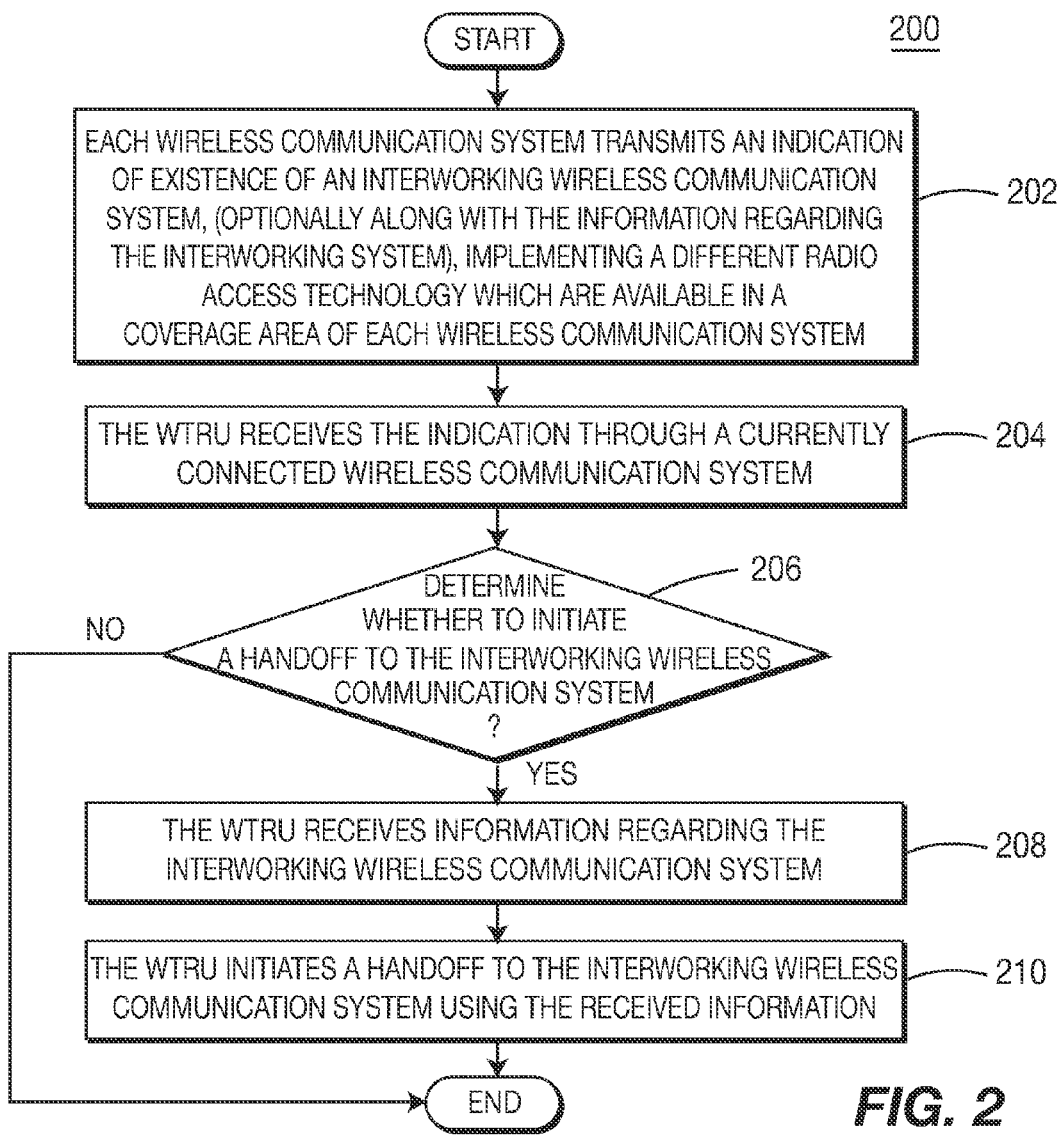
FIG. 2 is a flow diagram of a process for switching a radio access technology (RAT) in accordance with the present invention.

FIG. 2 is a flow diagram of a process 200 for switching a RAT in accordance with the present invention. A plurality of wireless communication systems are deployed with overlapping coverage areas. Each wireless communication system implements a different RAT and are configured such that a service that is provided by one wireless communication system may be provided through the other wireless communication system.

Each wireless communication system transmits an indication of the existence of an inter-working wireless communication system, optionally along with information of the alternative wireless communication system (including an identifier, frequency, etc), which implements a different RAT within the coverage area of each wireless communication system (step 202). The indication and/or the information may be broadcast to WTRUs or may be sent via a dedicated channel for the WTRUs. The WTRU receives the indication and/or the information through a currently connected wireless communication system (i.e. the wireless communication system to which the WTRU is currently connected) (step 204).

Alternatively, the indication and/or the information may be transmitted in response to a request message for the information or a capability report from the WTRU. In response, the currently connected wireless communication system sends an indication of availability of the inter-working wireless communication system and/or the information about the inter-working wireless communication system to the WTRU. In such case, the indication and/or the information may be transmitted via a DCCH to the WTRU.

After receiving the indication and/or the information, it is determined whether to initiate a handoff to the inter-working wireless communication system (step 206). As mentioned above, this determination may be made at the network or at the WTRU and may be based on any predetermined criteria, as desired. The handoff may be initiated by a user's request or may be initiated autonomously based on service requirements. The WTRU may display the availability of the inter-working wireless communication system on its display screen or provide an alarm alerting the user of the same. If it is determined to handoff the WTRU to the inter-working wireless communication system and if only the indication has been sent, the WTRU requests the information regarding the inter-working wireless communication system and receives it from the currently connected wireless communication system (step 208). If the information has been transmitted along with the indication or is simply sent without any indication, step 208 is skipped. The WTRU then initiates a handoff procedure using the received information (step 210).

In the context of a UTRAN-WLAN example as used herein, the information may be SSIDs of the I-WLANs, and optionally may further include a corresponding PLMN ID and the corresponding coordinates, (i.e., location), of each SSID. The WTRU initiates active or passive scanning for the identified WLANs after receiving the SSIDs of the I-WLANs. The WLAN scanning may be limited to WLANs identified by the received SSIDs.

Association with a particular WLAN AP may be based on channel quality measurements. If channel quality measurements from all WLANs are under a predefined threshold, the initial UTRAN connection is maintained. If an acceptable WLAN AP is found, the UTRAN may be notified of the cell change over the DCCH of the cell change. Connection security may be enabled by information such as wired equivalent privacy (WEP) information. The WTRU continues to scan for APs of common SSIDs of WLAN association and disassociation procedures. If an acceptable AP is not found, the WTRU may either scan for an alternate WLAN identified by a known SSID, or revert back to the UTRAN connection. In this case, an inter RAT cell change indication may be signaled. The choice to switch RATs may either be autonomous based on quality measurements within a predefined threshold or manually controlled by user input. After the RAT cell change, the WTRU continues to receive the same services that the WTRU receives from the currently connected wireless communication system through the alternative wireless communication system.

FIG. 3 is a signaling diagram of an exemplary process 300 for exchanging messages among a WTRU 102, a UTRAN cell 110, and a WLAN 120 for handoff from the UTRAN cell 110 to the WLAN 120 in accordance with the present invention. The UTRAN cell 110 transmits an indication of availability of any I-WLANs, (and/or optionally along with a list of SSIDs of available WLANs) (step 302). The transmission may be triggered by a report from the WTRU 102 indicating WLAN capability of the WTRU 102. The WTRU 102 receives the I-WLAN availability indication and/or list of SSIDs (step 304). In the case that only the indication is transmitted, the WTRU 102 sends a request for SSIDs of WLANs (step 306). In the case that the SSID list is transmitted along with the indication or the list is sent without any indication, steps 306-310 are omitted. Upon receipt of the request, the UTRAN cell 110 retrieves the SSIDs information (step 308). The UTRAN cell 110 transmits the list of WLAN SSIDs and optionally their associated locations and PLMN ID (step 310). After receiving the list of SSIDs, the WTRU 102 stores them in a memory and scans, either actively or passively, for an appropriate AP using the list (step 312). If the WTRU 102 is within the range of the WLAN coverage, the WTRU 102 initiates an I-WLAN selection (step 312). The WTRU 102 initiates a WLAN service with the selected WLAN (step 314). The WLAN 120 authenticates the WTRU 102 and may allocate a new IP address, if necessary, which typically depends on the type of inter-working scheme being implemented, as explained in more detail below (step 316). After authentication is completed at step 318, access to the WLAN service is granted for the WTRU 102 (step 320).

As mentioned above, different inter-working schemes may be used for connecting the I-WLAN to the UTRAN. For example, under the current wireless communication standards, the I-WLAN may be connected to the 3GPP system via a core network, (i.e., packet date gateway (PDG)), or via the UTRAN as a pipe. In the latter case, no new IP address is assigned in case of I-WLAN reselection, (handoff from the 3GPP system to I-WLAN). In the former case, (i.e., PDG based interworking), new procedures are used to allocate an IP address to the WTRU operating in the I-WLAN. These procedures are different than those used in the 3GPP system and thus may result in the assignment of a new IP address for the WTRU.

Although the elements in the Figures are illustrated as separate elements, these elements may be implemented on a single integrated circuit (IC), such as an application specific integrated circuit (ASIC), multiple ICs, discrete components, or a combination of discrete components and IC(s). Although the features and elements of the present invention are described in the preferred embodiments in particular combinations, each feature or element can be used alone without the other features and elements of the preferred embodiments or in various combinations with or without other features and elements of the present invention. Furthermore, the present invention may be implemented in any type of wireless communication system.

What is claimed is:

1. A method for use in a wireless transmit/receive unit (WTRU), the method comprising:
   the WTRU receiving a service from a core network via a cellular radio access network;
   the WTRU evaluating a predetermined criteria for inter-system handoff;
   the WTRU sending a first message via the cellular radio access network, wherein the first message indicates that the WTRU is capable of communicating using wireless local area network (WLAN) technology;
   the WTRU receiving a second message via the cellular radio access network based on a condition that the predetermined criteria for inter-system handoff is satisfied, wherein the second message is responsive to the first message and includes identifiers of at least one wireless network that is appropriate for inter-system handoff of the WTRU;
   the WTRU selecting, from the at least one wireless network, a first wireless network for handover in response to the second message, wherein the first wireless network has a connection to the core network and is configured to inter-work with the core network, such that the service may be forwarded from the core network to the WTRU through the first wireless network, thereby continuing the service to the WTRU;
   the WTRU performing the handover to the first wireless network, wherein performing the handover comprises the WTRU changing a first IP address of the WTRU that is associated with the cellular radio access network to a second IP address that is associated with the first wireless network; and
   the WTRU receiving the service from the core network via the first wireless network.

2. The method of claim 1, wherein the at least one wireless network is a WLAN, and wherein the identifiers are Service Set Identifiers (SSIDs).

3. The method of claim 2, wherein the receiving the service via the first wireless network includes receiving the service via a packet data gateway (PDG).

4. The method of claim 1, wherein the second message includes location information for the at least one wireless network.

5. The method of claim 1, further comprising:
   determining to initiate the handover based on a channel quality measurement.

6. The method of claim 1, further comprising:
   determining to initiate the handover based on input from a user of the WTRU.

7. The method of claim 1, further comprising:
   determining to initiate the handover based on requirements of the service.

8. The method of claim 1, wherein the cellular radio access network is based on Third Generation Partnership Project (3GPP) technology.

9. A wireless transmit/receive unit (WTRU) comprising:
   a processor; and
   a memory comprising instructions that, when executed by the processor, cause the WTRU to:
      receive a service from a core network via a cellular radio access network;
      evaluate a predetermined criteria for inter-system handoff;

send a first message via the cellular radio access network, wherein the first message indicates that the WTRU is capable of communicating using wireless local area network (WLAN) technology;

receive a second message via the cellular radio access network based on a condition that the predetermined criteria for inter-system handoff is satisfied, wherein the second message is responsive to the first message and includes identifiers of at least one wireless network that is appropriate for inter-system handoff of the WTRU;

select, from the at least one wireless network, a first wireless network for handover in response to the second message, wherein the first wireless network has a connection to the core network and is configured to inter-work with the core network, such that the service may be forwarded from the core network to the WTRU through the first wireless network, thereby continuing the service to the WTRU;

perform the handover to the first wireless network, wherein performing the handover comprises the WTRU changing a first IP address of the WTRU that is associated with the cellular radio access network to a second IP address that is associated with the first wireless network; and receive the service from the core network via the first wireless network.

10. The WTRU of claim 9, wherein the at least one wireless network is a WLAN, and wherein the identifiers are Service Set Identifiers (SSIDs).

11. The WTRU of claim 10, wherein receiving the service via the first wireless network includes receiving the service via a packet data gateway (PDG).

12. The WTRU of claim 9, wherein the second message includes location information for the at least one wireless network.

13. The WTRU of claim 9, wherein the instructions, when executed by the processor, further cause the WTRU to:
    determine to initiate the handover based on a channel quality measurement.

14. The WTRU of claim 9, wherein the instructions, when executed by the processor, further cause the WTRU to:
    determine to initiate the handover based on input from a user of the WTRU.

15. The WTRU of claim 9, wherein the instructions, when executed by the processor, further cause the WTRU to:
    determine to initiate the handover based on requirements of the service.

16. The WTRU of claim 9, wherein the cellular radio access network is based on Third Generation Partnership Project (3GPP) technology.

* * * * *